United States Patent
Sudrot et al.

(10) Patent No.: US 11,858,234 B2
(45) Date of Patent: Jan. 2, 2024

(54) DECORATIVE ASPHALTIC MEMBRANE AND ITS MANUFACTURING PROCESS

(71) Applicant: TITANIUM TECHNOLOGIES SAS, Ciudad Autonoma de Buenos Aires (AR)

(72) Inventors: Esteban Carlos Sudrot, Ciudad Autonoma de Buenos Aires (AR); Leonardo Ariel Barone, Ciudad Autonoma de Buenos Aires (AR); Roberto Esteban Carlos, Ciudad Autonoma de Buenos Aires (AR)

(73) Assignee: TITANIUM TECHNOLOGIES SAS, Buenos Aires (AR)

( * ) Notice: Subject to any disclaimer, the term of this patent is extended or adjusted under 35 U.S.C. 154(b) by 12 days.

(21) Appl. No.: 17/639,053

(22) PCT Filed: Jul. 21, 2020

(86) PCT No.: PCT/CL2020/050076
§ 371 (c)(1),
(2) Date: Feb. 28, 2022

(87) PCT Pub. No.: WO2021/035370
PCT Pub. Date: Mar. 4, 2021

(65) Prior Publication Data
US 2022/0203652 A1    Jun. 30, 2022

(30) Foreign Application Priority Data
Aug. 28, 2019   (AR) ............................. 20190102442

(51) Int. Cl.
*B32B 11/04*    (2006.01)
*B32B 15/09*    (2006.01)
(Continued)

(52) U.S. Cl.
CPC .............. *B32B 11/04* (2013.01); *B32B 15/09* (2013.01); *B32B 15/20* (2013.01); *B32B 27/08* (2013.01);
(Continued)

(58) Field of Classification Search
None
See application file for complete search history.

(56) References Cited

U.S. PATENT DOCUMENTS

2019/0032337 A1*   1/2019   Sipag ........................ E04D 5/10

FOREIGN PATENT DOCUMENTS

AR           094049 A1        7/2015
AR           050464 A1        10/2016
(Continued)

OTHER PUBLICATIONS

Machine translation of DE 19851808 A1. (Year: 2000).*

*Primary Examiner* — Ramsey Zacharia
(74) *Attorney, Agent, or Firm* — Nath, Goldberg & Meyer; Joshua B. Goldberg

(57) ABSTRACT

A decorative asphaltic membrane that comprises a lower non-stick layer; an intermediate layer composed of a support between two layers of plastic and oxidized modified bitumen wherein the support is a polyethilene; an upper layer composed of three sheets: a lower metallic sheet, preferably aluminium, an intermediate polyester sheet and an upper polyethilene sheet wherein the polyester sheet provides a superficial printing with different chromatic patterns on its lower face. The printing imitates, not exclusively, bricks, tiles, lawn, wood, stone, texts, sports logotypes or those belonging to institutions and/or enterprises. The manufacturing process of the asphaltic membrane comprises the steps of:
a. printing the lower face of the polyester sheet with a flexographic process or a hollow engraving process;
(Continued)

b. drying the printing;
c. laminating said printed polyester sheet between a polyethilene sheet and a support sheet forming the upper layer; and
d. laminating said upper layer with an intermediate layer and a lower non-stick layer, wherein the intermediate layer is, in turn, a lamination of a polyethilene sheet between two layers of plastic or oxidized modified bitumen.

9 Claims, 1 Drawing Sheet

(51) Int. Cl.
    *B32B 15/20*     (2006.01)
    *B32B 27/08*     (2006.01)
    *B32B 27/36*     (2006.01)
    *B32B 27/32*     (2006.01)
    *B32B 37/02*     (2006.01)
    *B32B 38/00*     (2006.01)

(52) U.S. Cl.
    CPC .............. *B32B 27/32* (2013.01); *B32B 27/36* (2013.01); *B32B 37/02* (2013.01); *B32B 38/145* (2013.01); *B32B 2250/03* (2013.01); *B32B 2250/05* (2013.01); *B32B 2307/4023* (2013.01); *B32B 2307/71* (2013.01); *B32B 2307/732* (2013.01)

(56) References Cited

FOREIGN PATENT DOCUMENTS

| | | |
|---|---|---|
| CL | 2018001854 A1 | 11/2018 |
| CN | 108248128 A | 7/2018 |
| DE | 19851808 A1 * | 5/2000 ............ B32B 11/04 |

* cited by examiner

DECORATIVE ASPHALTIC MEMBRANE AND ITS MANUFACTURING PROCESS

FIELD OF THE INVENTION

The present invention relates to a decorative asphaltic membrane, more specifically a decorative asphaltic membrane with different chromatic patterns of designs, yet more specifically: a decorative asphaltic membrane with different chromatic patterns to be applied either on horizontal or vertical surfaces.

BACKGROUND OF THE INVENTION

During a long time, asphaltic membranes of the prior art have not had into account any decorative aspect. The natural color of same was that of the upper substrates: natural aluminium, grey, black, dark brown. Over time, asphaltic membranes started to be painted. Special epoxy paints were used and the simulation of asphaltic membranes as to the environment was achieved, but always with an only color, preferable white, red brick or similar ones.

Various documents mention "aesthetic" or "decorative" aspects (U.S. Pat. Nos. 4,469,731; 4,610,902) but they make reference to roughness, bending aspects, etc., and not to color aspects of the asphaltic membrane.

Argentine patent application P2017 01 01948 of Megaflex, filed on Jul. 13, 2017, reveals an asphaltic membrane with multi-layer, trafficable, colored coating. Novelty lies on the fact that one of its layers is made of a synthetic polymer, that apart from being resistant to UV rays, includes pigments that work as a dye for the upper layer. That is: a layer is pigmented, with an only color. There are no possibilities of offering different patterns of drawings and colors.

Argentine patent AR 050464 of Megaflex, filed on Aug. 19, 2005 and granted on Oct. 19, 2009, reveals a multi-layer asphaltic lamination for waterproofing. It also reveals, in a subordinated claim, the application of a surface cleaning treatment, of color priming, of printings, of drawings and/or a combination therefrom. This patent reveals the application of colors over the surface of the asphaltic membrane, not inside same.

OBJECTS OF THE INVENTION

The first object of the present invention is to provide an asphaltic membrane with different chromatic patterns, resistant to bleaching.

Another object of the present invention is to provide an asphaltic membrane wherein chromatic patterns imitate, not exclusively, bricks, tiles, lawn, wood, stone, sports logotypes or those belonging to institutions/enterprises, texts, etc.

Another object of the present invention is to provide an asphaltic membrane that, given its decorative features, is appropriate to be applied onto vertical structures such as walls, columns, etc.

Another object of the present invention is to provide an asphaltic membrane that offers protection against UV rays.

SUMMARY OF THE INVENTION

In the manufacturing of an asphaltic membrane, a printing is applied to one of the polyethylene sheets so that said printing remains at sight once the asphaltic membrane is placed.

The printing may provide different patterns, either of designs as well as of colors. Preferably, patterns such as bricks, tiles, lawn, wood, stone, sports logos and those belonging to institutions/enterprises, texts, etc., are used.

DETAILED DESCRIPTION OF THE INVENTION

Asphaltic Membrane

Figure 1:
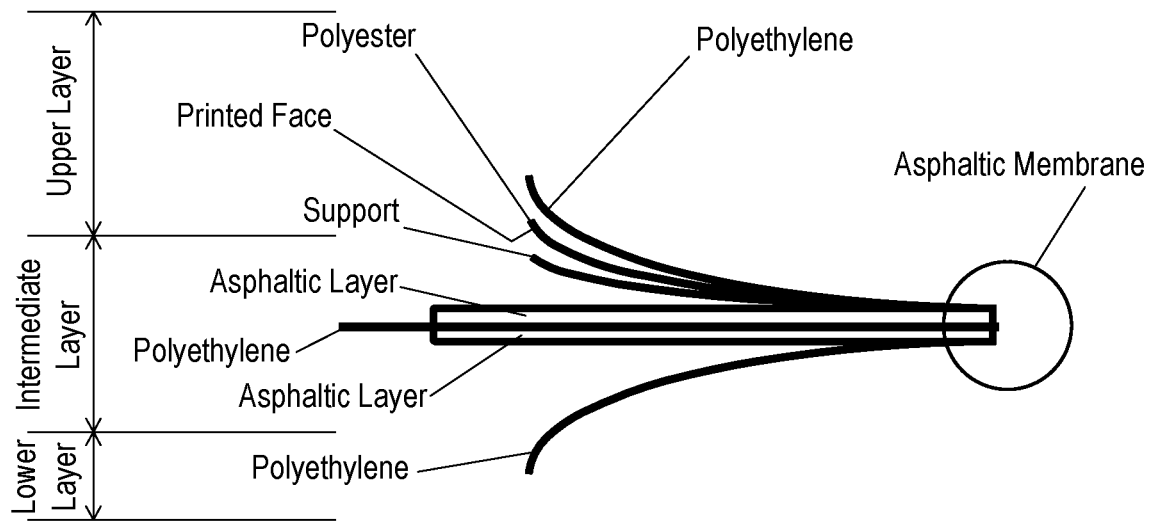
FIG. 1 shows a cutting detail of an asphaltic membrane according to the present invention.
Figure 2:
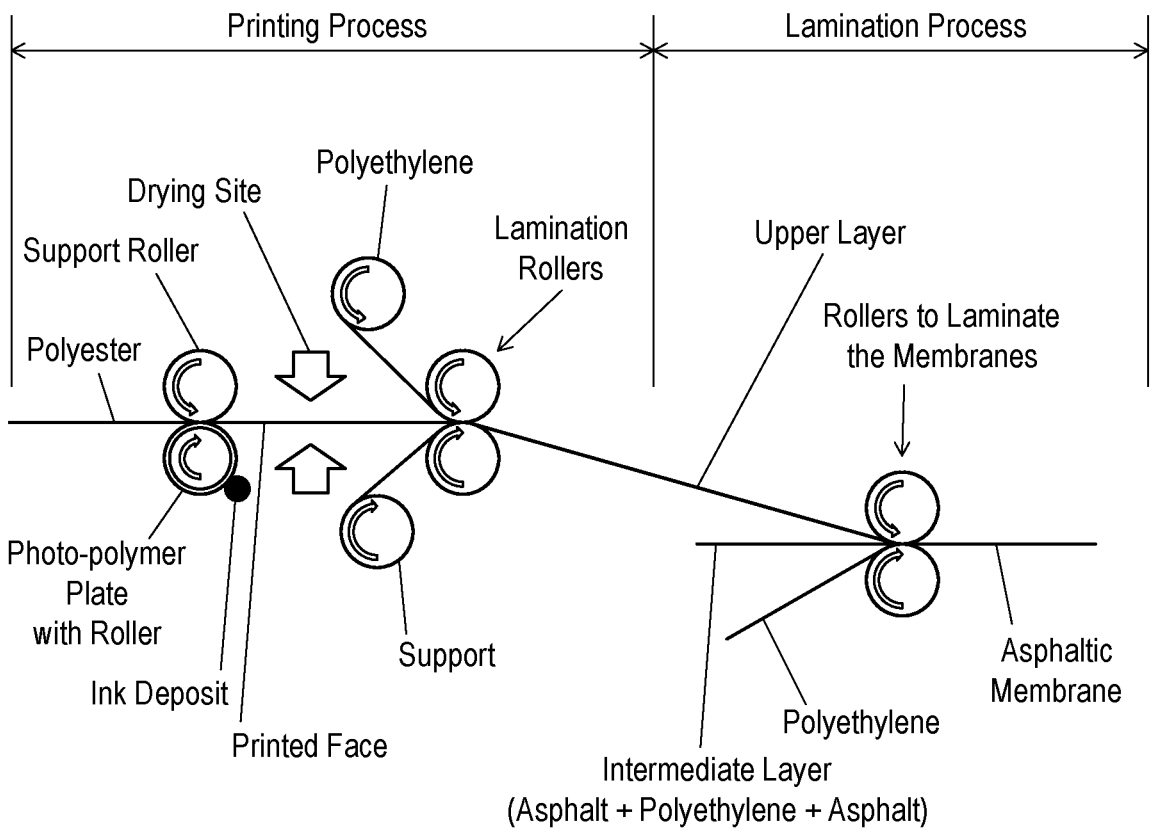
FIG. 2 shows a display of the rolling mill to obtain an asphaltic membrane according to the present invention.

In the present description, it will be understood that the polyethylene material may be a low density polyethylene (PEBD, Spanish acronym), a high density polyethylene (PEAD, Spanish acronym) or mixtures of same.

The asphaltic membrane of the present invention is made up by 3 layers: a first lower non-stick layer, an second intermediate layer that grants waterproof features and a third upper layer that grants protection to the intermediate layer and, in our case, provides the desired design pattern.

The lower layer is a non-stick sheet. Its function is to protect the lower part of the intermediate layer during the stowage until its application. A high density polyethylene sheet is preferred. The polyethylene sheet has a thickness that ranges between 7µ and 30µ, preferably 15µ. This lower layer may also be made with non-stick asphalt to allow its cold application.

The second layer, the intermediate one, and also known as support, provides at least three components: a polyethylene layer, preferably of high density. The polyethylene sheet has a thickness ranging between 7µ to 120µ. The bitumen is modified with inert mineral loads, such as ashes, calcareous fillers and in percentages of up to 70% of the total asphaltic product.

In certain embodiments, the intermediate layer may also include an additional polyethylene layer and an asphaltic layer of modified bitumen.

The third layer, the upper one, is made of 3 sheets. Its display, from the outside to the inside, is: a polyethylene sheet, preferably of high density, a polyester sheet and a support. The polyester sheet has a thickness ranging between 7µ to 20µ, preferably 12µ. The support may be a metallic sheet, preferably aluminium, a non woven geotextile fabric or aluminized polyethylene. The metallic sheet preferably has a thickness that ranges between 7µ and 30µ. The geotextile fabric may have a weight that ranges between 50 and 180 g/cm². The polyethylene sheet has a thickness that ranges between 7µ and 150µ, preferably 60µ, and is added with components for the protection against UV rays. Before its lamination with the other two sheets to form the upper layer of the asphaltic membrane, a printing is applied to the polyester sheet on its lower side. Said printing shall be in contact with the support and be protected from the outside by the polyethylene sheet itself.

The decorative asphaltic membrane of the present invention may provide designs which are away from the common grey, so that its application on walls or vertical surfaces is attractive.

The printing is made through a flexographic process or by means of a hollow engraving process. The digital photopolymer is prepared with the desired design. Inks shall be compatible with the lamination process. Inks are preferably based on solvents, water or UV inks. They are not viscous to attain a quick drying. They must be translucent since colors are added and not hidden.

Manufacturing Process:

As in any process known in the art related to the manufacturing of asphaltic membranes, same are laminated through a rolling mill with the required speeds and temperatures to obtain the final product. In the present invention, an additional printing process is added onto one of the layers, before using the rolling mill. The printing process may be temporally or physically independent of the lamination process of the asphaltic membrane.

The printing of the lower side of a polyester sheet is made with techniques known in the prior art. The ink is dried and this printed polyester sheet shall enter a first rolling mill to form the upper layer; a support, preferably aluminium, the printed polyester sheet and the polyethylene sheet.

Then, a second rolling mill will laminate the three layers: the upper one (already printed), the intermediate one (already made up by a polyethylene between two layers of asphalt) and the lower one to form the decorative asphaltic membrane.

The invention claimed is:

1. A decorative asphaltic membrane that comprises a lower non-stick layer; an intermediate layer having a support between two layers of plastic and oxidized modified bitumen wherein the support is a polyethylene; an upper layer composed of three sheets: a lower metallic sheet, an intermediate polyester sheet and an upper polyethylene sheet wherein the polyester sheet provides a surface printing with different chromatic patterns on its lower face.

2. The decorative asphaltic membrane of claim 1 wherein the lower polyethylene layer has a thickness that ranges between 7μ and 30μ; the polyethylene sheet of the intermediate layer has a thickness that ranges between 7μ and 120μ; the polyethylene sheet of the upper layer has a thickness that ranges between 7μ and 150μ; and the polyester sheet of the upper layer has a thickness that ranges between 7μ and 20μ.

3. The decorative asphaltic membrane of claim 2 wherein the lower polyethylene layer has a thickness of 15μ; the polyethylene sheet of the upper layer has a thickness of 60μ; and the polyester sheet of the upper layer has a thickness of 12μ.

4. The decorative asphaltic membrane of claim 1 wherein the printing imitates, not exclusively, bricks, tiles, lawn, wood, stone, texts, sports logotypes or those belonging to institutions/enterprises.

5. The decorative asphaltic membrane of claim 1 wherein the upper polyethylene sheet provides protection against UV rays.

6. The decorative asphaltic membrane of claim 1 wherein it is apt to be applied on walls, columns or vertical surfaces.

7. A manufacturing process of the decorative asphaltic membrane of claim 1 wherein it comprises the steps of:
   a. printing the lower face of the polyester sheet with a flexographic process or a hollow engraving process;
   b. drying the printing;
   c. laminating said printed polyester sheet between a polyethylene sheet and a support sheet forming the upper layer; and
   d. laminating said upper layer with an intermediate layer and a lower non-stick layer, wherein the intermediate layer is, in turn, a lamination of a polyethylene sheet between two layers of plastic and oxidized modified bitumen.

8. A manufacturing process of claim 7 wherein steps a. to c. are made independently from the rest of the steps.

9. The decorative asphaltic membrane of claim 1 wherein the lower metallic sheet is aluminium.

\* \* \* \* \*